United States Patent [19]

Ortloff et al.

[11] 4,126,336
[45] Nov. 21, 1978

[54] MULTILINE SWIVEL

[75] Inventors: John E. Ortloff; Anthony J. Masciopinto; Kerry G. Kirkland, all of Houston, Tex.

[73] Assignee: Exxon Production Research Company, Houston, Tex.

[21] Appl. No.: 752,754

[22] Filed: Dec. 20, 1976

[51] Int. Cl.² .............................................. F16L 39/00
[52] U.S. Cl. ..................................... 285/136; 285/190
[58] Field of Search .................... 285/137 R, 132, 122, 285/134, 123, 136, 190, 168; 137/236, 615

[56] References Cited

U.S. PATENT DOCUMENTS

| 2,768,843 | 10/1956 | Zeilman | 285/136 X |
| 2,873,810 | 2/1959 | Orton | 285/137 R X |
| 2,943,868 | 7/1960 | Hanback | 285/168 X |
| 3,698,433 | 10/1972 | Dobler | 285/136 X |

FOREIGN PATENT DOCUMENTS 205,601  6/1966  Sweden ................................. 285/137 R Primary Examiner—Dave W. Arola
Attorney, Agent, or Firm—Salvatore J. Casamassima; Robert L. Graham

[57] ABSTRACT

A multiline fluid swivel comprises a plurality of vertically mounted modules, each module containing a shaft and a housing which circumferentially surrounds the shaft. A conduit within the shaft and a manifold within the housing provide a continuous fluid path through each module. Completing the fluid paths of the modules are fluid lines entering the base of each shaft and entering ports located on each housing.

4 Claims, 5 Drawing Figures

MULTILINE SWIVEL

BACKGROUND OF THE INVENTION

1. Field of the Invention

This invention relates to equipment useful in transferring fluids. In particular, it relates to multiple line, fluid swivels capable of transferring fluids to and from ships, tankers and other sea-going vessels.

2. Description of the Prior Art

During the past several years the search for oil and gas in offshore areas has greatly expanded and has now progressed into deep, rough waters such as in the North Sea. To facilitate production of oil and gas from remotely located offshore fields, complex tanker mooring systems, which serve as centralized production sites for the entire field, have been developed. Normally, a bundle of flexible fluid lines extending from a subsea location to the mooring site permits the transfer of fluids between a moored tanker and the subsea location. For example, certain fluid lines may be used to convey oil and gas into the tanker while other fluid lines may be used to inject liquids or gases back into the field for the purpose of well stimulation or storage.

Under the influence of wind and waves, a tanker will tend to move in various directions about a mooring site. To permit the tanker to rotate and move freely without causing twisting or entanglement of the various fluid lines to which the tanker is attached, it is necessary to provide a swivel mechanism to connect the fluid lines to the mooring site. Furthermore, since a plurality of fluid lines are involved, it is necessary that such a swivel have the capability of accomodating multiple lines.

Multiline, fluid swivels have been developed for offshore oil field applications. (See, for example, U.S. Pat. Nos. 2,894,268 and 3,698,433.) However, most of the multiline swivel designs known in the art involve the use of stationary pipes which extend from the flexible fluid lines and which elbow into and mate with individual swivel headers. The headers are normally mounted together in a vertically stacked arrangement. Rotatable manifolds, peripherally positioned on the headers, provide fluid communication with the stationary pipes and permit free rotation of external fluid lines. The limitation of this type of design, is that it is primarily intended for low or moderate pressure operation. High pressure fluids within the stationary pipes of this type of swivel tend to displace or move the pipes at the point at which they elbow into the manifolds, thereby creating excessive tensile loading on the swivel headers. Such excessive loading can ultimately lead to leakage across fluid seals and failure of the swivel. Thus there is a need in the art for a multiline swivel capable of handling the transfer of high pressure fluids.

SUMMARY OF THE INVENTION

The swivel of the present invention is a multiple line fluid swivel capable of transferring high pressure fluids. The swivel generally comprises a plurality of vertically mounted or stacked modules fixedly attached to one another. Each module contains, as basic components, a stationary cylindrical shaft and a rotatable housing circumferentially surrounding the shaft.

Each shaft has bored within it, a conduit that extends from the base of the shaft to the side of the shaft. The module housing sealingly engages the side exterior of the shaft and is free to rotate about the shaft. The housing has a port and an interior annular manifold which provides a peripheral cavity around the outside of the shaft. Thus there exists a continuous fluid path from the housing port, through the housing manifold and shaft conduit, to the base of the shaft. Fluids may flow in either direction through this path, such flow being uninterrupted by the rotation of the housing.

A first set of fluid lines is mated with the housing ports (e.g., by flanged connection). A second set of fluid lines enters the base of the swivel and extends upwardly through the swivel. Each of the second fluid lines terminates at the module shaft to which it corresponds and mates with the shaft by being threadably inserted into the conduit of the shaft at its base. Fluid communication, therefore exists between the respective sets of fluid lines. Passageways must be provided through the lower shafts so that the fluid lines can pass through upwardly to communicate with modules that are above these shafts.

Using solid stationary shafts, rather than hollow metal shells, permits threadable insertion of each flow line into its respective shaft. Such an arrangement provides much greater pressure integrity for the swivel since pressure exerted by fluids passing through the swivel module is contained within the shaft conduit.

DESCRIPTION OF THE PREFERRED EMBODIMENT

Figure 1:
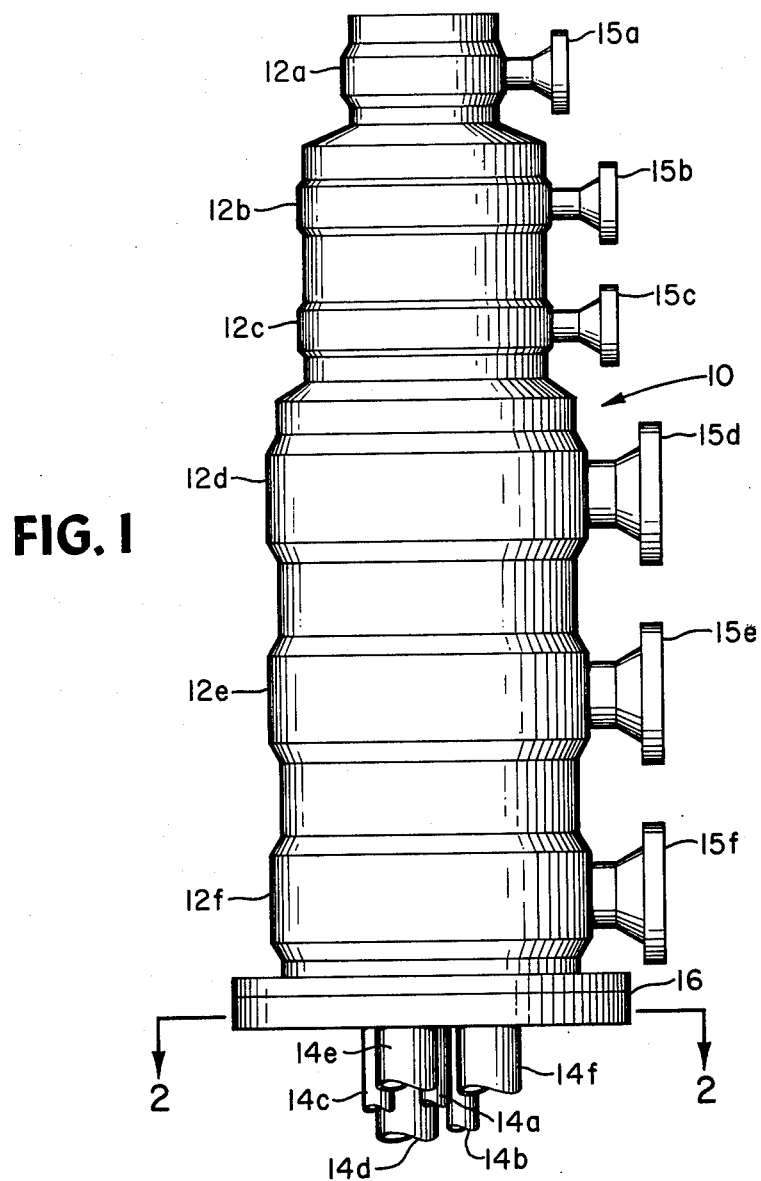
FIG. 1 is a schematic drawing of the multiline swivel apparatus of the present invention.

The swivel of the present invention can comprise a plurality of modules, stacked in vertical alignment, to provide multiple rotation for a series of flow lines. FIG. 1 shows an embodiment of a six module swivel which is capable of handling six separate flow lines. The swivel is designed to provide each individual flow line with independent 360° rotation about a vertical axis.

Referring to FIG. 1, multiline swivel 10 contains six modules 12 $a$-$f$, vertically stacked and mounted together. Fluid lines 14 $a$-$f$ enter the swivel through base plate 16 and are in fluid communication with their corresponding swivel ports 15 $a$-$f$. Since fluids can flow through the swivel in either an incoming or outgoing direction, the ports can serve as inlet or outlet conduits for the swivel. For example, if the first swivel module 12$a$ performs the function of gas injection, gas would be introduced through port 15$a$ and would exit through fluid line 14$a$. Similarly oil produced from a subsea well might enter swivel 10 through flow line 14$f$ and would exit from port 15$f$. Thus the multiline capability of the swivel permits performance of several functions such as oil production and gas injection.

Figure 2:
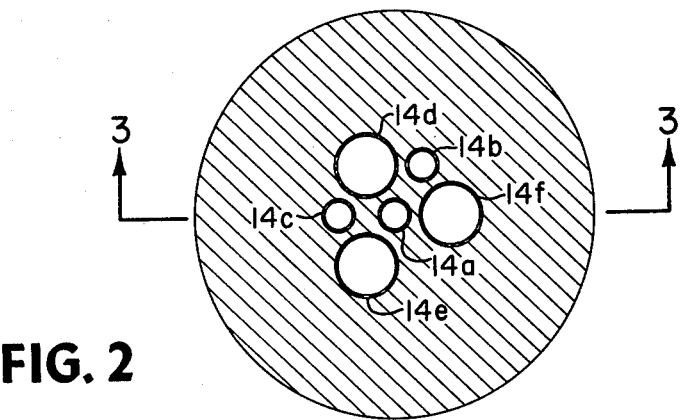
FIG. 2 is a cross-sectional view of the fluid lines of the swivel along plane 2—2 of FIG. 1.

FIG. 2 shows a cross-sectional overview of fluid lines 14 $a$-$f$ through base plate 16 along plane 2—2 of FIG. 1. The cross section illustrates that the fluid lines may be of varying diameter depending upon the function perfomed or the fluid handled. For example, if the fluid line 14a is used for gas injection it would be a small diameter line capable of handling very high pressures (e.g., 7500 psi). The other flow lines, handling different fluids and performing different functions, might have larger diameter and operate at somewhat lower pressures (e.g., 3000 to 5000 psi). A riser (not shown) can be used to enclose and support the fluid line bundle as it extends from the sea floor to the swivel.

Figure 3:
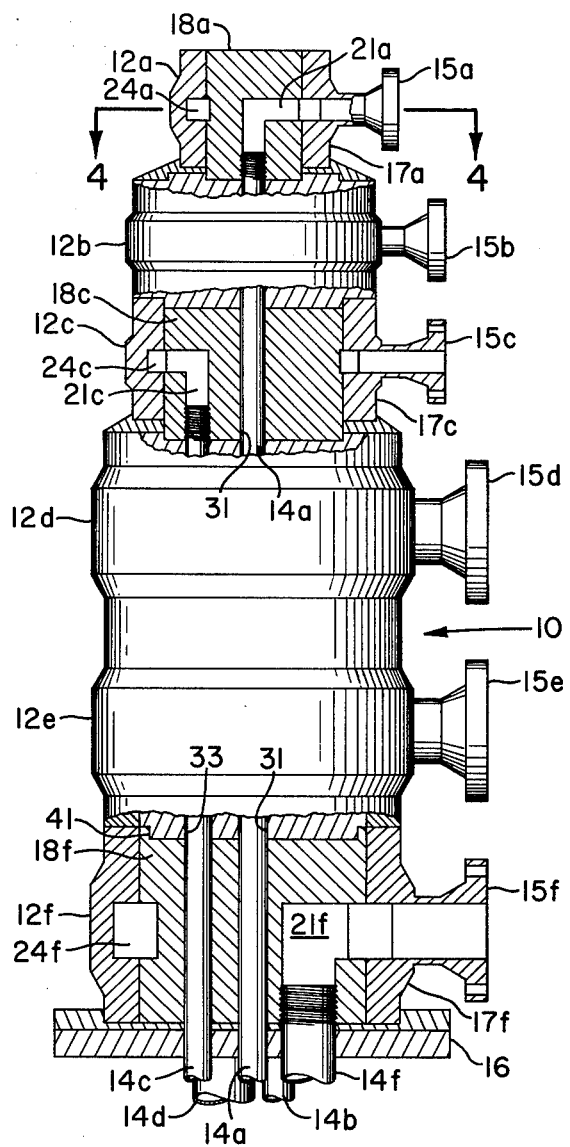
FIG. 3 is a partial cross-sectional view of the multiline swivel apparatus illustrated in FIG. 1, along plane 3—3 of FIG. 2.

FIG. 3 shows a partial cross-sectional view of the multi-line swivel along plane 3—3 of FIG. 2. Since plane 3—3 cuts across flow lines 14a, c and f, only the exposed cross sections of modules 12 a, c and f, are shown in FIG. 3. It should be noted, however, that module 12b is similar to and interchangeable with module 12c. Likewise, modules 12d, 12e and 12f are interchangeable.

For example, the shaft 18f of the lower module 12f is identical with the shafts of the upper modules 12e and 12d. Since the modules 12d, 12e, and 12f are interchangeable, the shafts of modules 12d and 12e will each have passageways that are not used. A passageway in each of these shafts will abut the top surface of the underlying shaft.

Each module contains two basic components — a shaft and a housing which rotates around the shaft. Using module 12a as an example, shaft 18a is formed from a solid piece of metal. Within the shaft is a right angle bore 21a which serves as a conduit through the shaft and as an "elbow" to alter the direction of fluid flow in the swivel. Peripherally surrounding the circumference of shaft 18a is housing 17a, which is permitted to rotate or "swivel" around the shaft. Both the housing and shaft are machined such that a manifold 24a toroidally envelopes the shaft. The rotational action of the housing will be explained later. Corresponding housings 17c and 17f, shafts 18c and 18f, manifolds 24c and 24f, and right angle bores 21c and 21f are shown for modules 12c and 12f.

Fluid line 14a enters swivel 10 at base plate 16 and extends through passages bored through the shafts of the other swivel modules 12b, c, d, e and f and is threadably connected at its upper end into the vertical segment of bore 21a. Thus fluid line 14a provides a fluid path between base plate 16 and shaft 18a.

Figure 4:
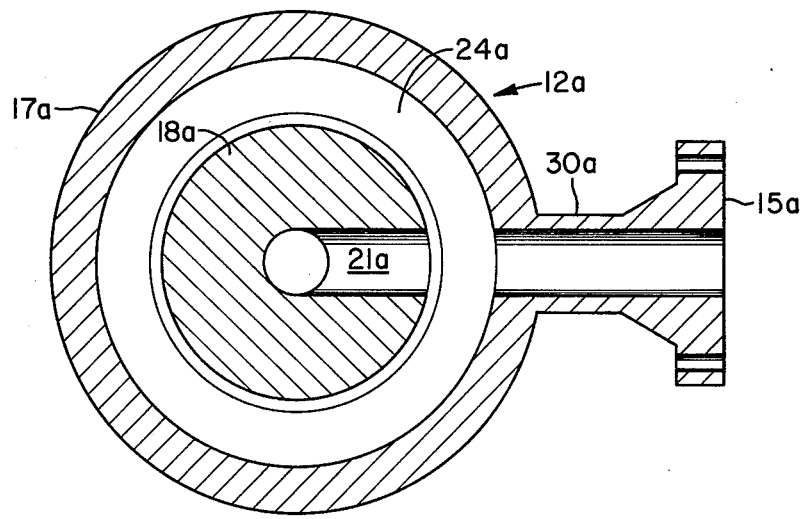
FIG. 4 is a cross section of the top swivel module along plane 4—4 of FIG. 3.

Fluid communication between port 15a and shaft 18a is provided by housing 17a. FIG. 4 shows a cross-sectional view of module 12a taken along plane 4—4 of FIG. 3, illustrating the fluid path within housing 17a. Port 15a mates with tangential pipe exit 30a of housing 17a. Manifold 24a is toroidally formed within the housing to provide an annular flow path around shaft 18a. Referring back to FIG. 3 it can be seen that shaft 18a contains a circumferential groove opposite the manifold flow channel to increase the overall width of the channel. Along its inner edge the manifold is open to the shaft to permit the flow of fluids into and out of the horizontal segment of right angle bore 21a. Thus, regardless of the rotational position of housing 17a, fluid flow between the shaft and the housing is always maintained. FIG. 3 shows a continuous fluid path which extends from base plate 16 to port 15a. Continuous fluid paths are similarly provided for the other modules.

Because module 12a is the top module, a passageway for line 14a must be provided through all of the other module shafts 12b through 12f. Therefore, each module shaft below module 12a contains a vertical passageway that exactly aligns with the vertical segment of right angle bore 21a. The diameter of the aligned passages should be sufficient to accomodate fluid line 14a extending therethrough. Module 12f, being the lowest of the modules, must contain five properly aligned and sized passages within shaft 18f to accomodate the lines extending from the modules above it.

Since module 12a is the top module and the smallest, it is convenient to centrally locate fluid line 14a through the axis of swivel 10. All of the remaining fluid lines will, therefore, be spaced from and parallel to line 14a. This alignment corresponds to the positioning of the incoming fluid lines depicted cross-sectionally in FIG. 2.

Further illustration of fluid line alignment can be seen by reference to FIG. 2 and to the cross section of modules 12c and 12f in FIG. 3. Module 12c also contains the basic components of a shaft 18c and a housing 17c. Flow line 14c threadably connects at its upper end into conduit 21c and provides a fluid path which extends from base plate 16 to port 15c via manifold 24c and right angle bore 21c. Module 12f is similarly designed.

Both modules 12c and 12f contain passages bored through their shafts to provide pathways for flow lines extending downward from the modules located above each respective module. The cross section shows passage 31 within shafts 18c and 18f to accomodate flow line 14a and passage 33 within shaft 18f to accomodate flow line 14c. Not shown in the cross-sectional of FIG. 3 are the passages provided for the flow lines from modules 12b, 12d and 12e.

To provide for interchangeability, the shafts of modules 12d, 12e and 12f contain the same number of passages although all are not required except in shaft 18f. For example, the shaft for module 12d contains clearance passages (not shown) for lines 14e and 14f although line 14e, being threadably connected into the shaft of module 12e, terminates at module 12e and line 14f, being threadably connected into the shaft of module 12f, terminates at module 12f. Similarly, the shafts of modules 12b and 12c contain the same number of passages although only shaft 18c requires all the passages. Line 14c, being threadably connected into shaft 18c, terminates at module 12c and therefore, is not required to pass through the shaft of module 12b. If interchangeability is not a desired feature, each shaft can be simplified by providing only the number of passages actually required for its position on the swivel stack.

The swivel modules are locked together in the stacked relationship shown in FIGS. 1 and 3 by long bolts (not shown) which extend through each of the module shafts and which, except for module 12f, are threaded into the shaft of the module below it. The bolts of module 12f are threaded into base plate 16. To further secure the modular arrangement, each shaft has a shoulder at one end and recess at the other end to permit close, concentric alignment of the shafts as they are stacked. For example, as shown in FIG. 3, numeral 41 points to the abuttment of the lower or shouldered end of the shaft of module 12e into the upper or recessed end of shaft 18f of module 12f.

The advantage of the swivel embodiment described above is that it provides much greater pressure integrity than multiline swivels previously known to the art. By utilizing in each module a solid shaft having a bored conduit and by inserting threaded flow lines into the conduit the pressures exerted by fluids passing through the module are entirely contained within the tube and the shaft conduit. Therefore, no tensile loading on clamping bolts securing the modules together can result from internal line pressure. Consequently, the multiline swivel of the present invention can readily transfer high pressure fluids.

Figure 5:
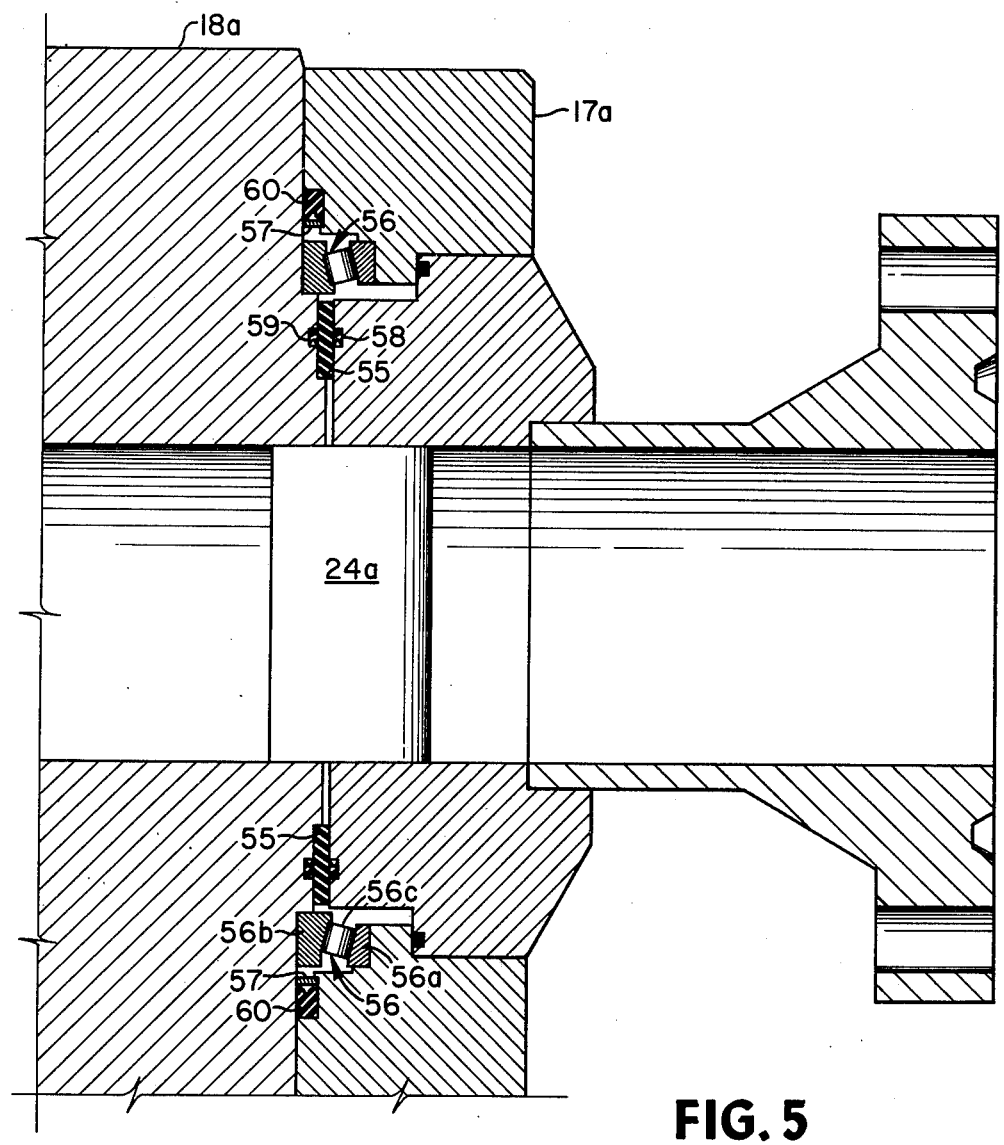
FIG. 5 is an enlarged partial cross-sectional view of the bearing and sealing arrangement of the top swivel module.

Another factor lending itself to the improved pressure integrity of the swivel of the present invention is the sealing arrangement provided for within each swivel housing. FIG. 5 shows an enlarged view of a segment of shaft 18a and housing 17a from module 12a. The seal configuration depicted in FIG. 5 permits pressure equalization across the seals thereby decreasing wear and improving the effectiveness of the seal.

Referring to FIG. 5, concentric bearing 56, comprising an outer race 56a, an inner race 56b and rollers 56c, is sealed from the fluid in manifold 24a of housing 17a by seals 58 and 59. Between seals 58 and 59 is annular piston ring 55 which is a large diameter ring having a thin cross section. On the outer side of bearing 56 is another seal 60 that isolates the bearing from the environment outside the swivel housing and retains the lubricating oil which completely fills the space between seals 58, 59 and 60. (Seal retainer ring 57 holds seal 60 in place.) Thus, when the annular cavity of housing 17a is filled with product fluid and is pressurized to line pressure, forces resulting from this pressure act on the face of annular piston ring 55. Because the lubricating oil in the bearing cavity is substantially incompressible, the pressure in the oil-filled cavity becomes equal to the pressure in the swivel housing due to the pressure applied by the free-floating annular piston. Likewise, because the pressure on both sides of piston ring 55 is equal, seals 58 and 59 in contact with the respective inner and outer diameters of piston ring 55 are not required to seal against pressure. Any preload pressure, such as that applied by a garter spring or leaf spring in the seal, will by sufficient to prevent flow of fluids across the seal when there is no pressure differential. Therefore, all of the pressure in swivel housing 17a is transferred through annular piston ring 55, to the lubricating oil in the bearing cavity, and finally to seal 60. Although seal 60 contains the pressure in the swivel housing, it operates in a clean oil environment. On the other hand, seals 58 and 59, although exposed to all the contaminants that may exist in the product fluid, operate at zero pressure differential. At zero pressure differential, the chance that foreign materials of an abrasive nature will be forced under the lip of the seal is minimized. The sealing and bearing arrangement disclosed in FIG. 5 for module 12a is also employed in the other five modules.

It should be apparent from the foregoing that the present invention offers significant advantages over multiline swivels previously known to the art. While the present invention has been described primarily with regard to the foregoing embodiments, it should be understood that the present invention cannot be deemed limited thereto but rather must be construed as broadly as all or any equivalents thereof.

What is claimed is:

1. A multiple line fluid swivel for conducting fluids to or from multiple flow lines which comprises:
   (a) upper and lower substantially identical stationary solid shafts, each shaft having a conduit formed therein extending from a bottom port in the base thereof and communicating with a side port thereof, and a passageway extending axially therethrough, said upper and lower shafts being fixedly secured together in abutting end-to-end relationship wherein the conduit of the upper shaft is aligned with the passageway of the lower shaft and the passageway of the upper shaft abuts the top surface of the lower shaft;
   (b) upper and lower substantially identical housings circumferentially mounted in close conformity, respectively, on said upper and lower shafts, each housing having a side port extending therethrough and an internal surface which in combination with the exterior of its companion shaft defines an annular flow chamber in fluid communication with the side port of the conduit of said shaft and the side port of said housing;
   (c) bearing means mounted above and below each annular flow chamber between each housing and its companion shaft whereby each housing is capable of rotating about its companion shaft;
   (d) seal means mounted above and below each annular flow chamber between each housing and its companion shaft; and
   (e) means for sealingly connecting a flowline to the bottom port of each shaft.

2. The multiple line fluid swivel as defined in claim 1 wherein said bearing means permits each housing to rotate about its companion shaft independently of the other housing.

3. The multiple line fluid swivel as defined in claim 2 wherein said bearing means permits 360° rotation of each housing about its companion shaft.

4. The multiple line fluid swivel as defined in claim 1 wherein a flowline extends through said passageway of said lower shaft and said means for sealingly connecting a flowline to the bottom port of each shaft includes means for threadedly connecting a flowline to the bottom port of said lower shaft, and means for connecting the flowline which extends through said passageway of the lower shaft to the bottom port of said upper shaft.

* * * * *